(12) United States Patent
Schoch et al.

(10) Patent No.: US 7,197,807 B2
(45) Date of Patent: Apr. 3, 2007

(54) CASTELLATED SNAP RING RETENTION SYSTEM AND METHOD

(75) Inventors: Kenneth D. Schoch, Greenwood, IN (US); William S. Reed, Greenfield, IN (US)

(73) Assignee: General Motors Corporation, Detroit, MI (US)

( * ) Notice: Subject to any disclaimer, the term of this patent is extended or adjusted under 35 U.S.C. 154(b) by 177 days.

(21) Appl. No.: 11/061,130

(22) Filed: Feb. 18, 2005

(65) Prior Publication Data

US 2005/0207835 A1    Sep. 22, 2005

Related U.S. Application Data

(60) Provisional application No. 60/555,141, filed on Mar. 22, 2004.

(51) Int. Cl.
*F16B 21/00* (2006.01)
*B21D 39/00* (2006.01)

(52) U.S. Cl. .................. 29/446; 267/178; 403/319

(58) Field of Classification Search ........... 403/DIG. 7
See application file for complete search history.

(56) References Cited

U.S. PATENT DOCUMENTS

| | | | | |
|---|---|---|---|---|
| 2,855,807 A * | 10/1958 | Gerst | ................. | 192/85 AA |
| 3,047,115 A * | 7/1962 | Lee et al. | ............... | 192/85 AA |
| 3,048,247 A * | 8/1962 | Cook et al. | ............ | 192/85 AA |
| 3,832,934 A * | 9/1974 | Dach et al. | ............ | 192/85 AA |
| 3,914,849 A * | 10/1975 | Martin | ...................... | 29/446 |
| 4,440,282 A * | 4/1984 | Ishimaru et al. | ........ | 192/85 AA |
| 5,416,966 A * | 5/1995 | Boerger et al. | ............... | 29/446 |
| 5,911,295 A * | 6/1999 | Itonaga et al. | ............. | 267/179 |
| 5,937,985 A | 8/1999 | Dover et al. | | |
| 5,992,834 A * | 11/1999 | Dover | ........................ | 267/178 |
| 6,811,349 B1 | 11/2004 | Loe et al. | .................. | 403/327 |

* cited by examiner

*Primary Examiner*—Rodney H. Bonck
(74) *Attorney, Agent, or Firm*—Christopher DeVries

(57) ABSTRACT

The present invention provides a system and method for releasably retaining at least one coil spring. The present invention utilizes a circumferential castellation formed within a housing operable to receive within the notches formed by the castellation a complimentary number of fingers formed from a retainer plate. The retainer plate is operable to hold the coil springs in compression and is fixed in place by an internal snap ring disposed within an inwardly facing circumferential grove formed on the radial inner side of the protruding blocks or dentils formed by the castellation.

9 Claims, 1 Drawing Sheet

CASTELLATED SNAP RING RETENTION SYSTEM AND METHOD

CROSS-REFERENCE TO RELATED APPLICATIONS

This application claims the benefit of U.S. Provisional Application No. 60/555,141, filed Mar. 22, 2004, which is hereby incorporated by reference in its entirety.

TECHNICAL FIELD

The present invention relates to a castellated snap ring system and method for releasably retaining a coil spring or multiple coil springs in compression with respect to a housing.

BACKGROUND OF THE INVENTION

Many mechanical designs employ retaining rings. The purpose of the retaining ring is to axially position a component on a shaft or within a bore, and to limit the movement of the component in a given direction, thereby setting the limits of assembly movement for that particular component. Retaining rings may be classified as either internal or external. Internal retaining rings fit into a housing or a bore while external retaining rings fit over a shaft or a pin.

One such example where external retaining rings are used is in the clutch assemblies of automatic transmissions. Clutch assemblies are used in automatic transmissions to selectively engage and disengage rotating members of different planetary gear sets. U.S. Pat. No. 6,811,349 to Loe et al., issued Nov. 2, 2004 to the assignee of the present invention, and hereby incorporated by reference in its entirety, discloses one such external retaining ring design for an automatic transmission clutch assembly. The Page invention seeks to cure one of the problems facing an external retaining ring, which is dislodgment due to centrifugal force. As the shaft in which the retaining ring is disposed rotates at high speed, the retaining ring may have a tendency to expand and thereby become loose within the groove and perhaps even expelled from the groove.

SUMMARY OF THE INVENTION

The present invention provides a system for and an improved method for releasably retaining a coil spring in compression with respect to a housing. In particular, the present invention is of particular benefit when used within a clutch assembly of an automatic transmission.

The present invention may require less space to implement than traditional snap ring designs.

Accordingly, the present invention provides a retaining apparatus having a housing with a circumferential castellation. The castellation forms a plurality of notches and a plurality of protruding blocks or dentils. Each of the dentils extends radially, is circumferentially oriented, and has a radially inwardly facing circumferential groove. A retainer plate has a plurality of approximately axially extending fingers, which are disposed respectively within the notches formed by the castellation. Each of the plurality of fingers has a flange disposed approximately perpendicular to its respective finger. Also provided is a resilient element disposed between the retainer plate and the housing for applying an axial force to the retainer plate. Additionally, a retaining ring retainable within the circumferential groove of the plurality of dentils is operable to limit the axial movement of the retainer plate with respect to the housing by engaging at least one of the flanges disposed on the plurality of fingers.

The present invention may further include at least one coil spring member as the resilient element.

Additionally, the plurality of dentils of the present invention may number six, and each of the plurality of dentils is evenly spaced from an adjacent other of the dentils with a width approximately equal to the arc length formed by a 40 degree included angle. In such a case, the plurality of fingers may number six and are sized such that they can interfit with a respective one of the plurality of notches.

The retainer plate may be formed from stamped metal and the retaining ring may be an internal snap ring.

In addition, the present invention provides a method of releasably retaining at least one coil spring with respect to a housing. This method includes providing the housing with a circumferential castellation forming a plurality of notches and a plurality of radially, inwardly facing dentils, each of the dentils having a radially inwardly facing circumferential groove. Subsequently, a retainer plate with a plurality of fingers is placed against the coil spring and oriented with respect to the housing so that the plurality fingers align respectively with the plurality of notches formed in the housing by the circumferential castellation. Then, at least one coil spring is compressed with the retainer plate in relation to the housing when the retainer plate is oriented so that each of the plurality of fingers respectively interfit with one of the plurality of notches. Finally, a retaining ring is placed within the radially inwardly facing circumferential groove after the compressing of the at least one spring to retain the at least one coil spring in compression with respect to the housing. The retaining ring may be an internal snap ring.

The present invention further provides a castellated snap ring arrangement for releasably retaining at least one coil spring. The castellated snap ring arrangement has an annular housing with a circumferential, radially directed castellation at least partially defining a spring cavity on a radially outer side of the castellation. Also provided is a retainer plate in a cooperative relationship with the castellation for retaining at least one spring within the spring cavity. Additional elements of the present invention include an internal snap ring for retaining the retainer plate in the cooperative relationship with the castellation and a circumferential groove on a radially inner side of the castellation for receiving the internal snap ring.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
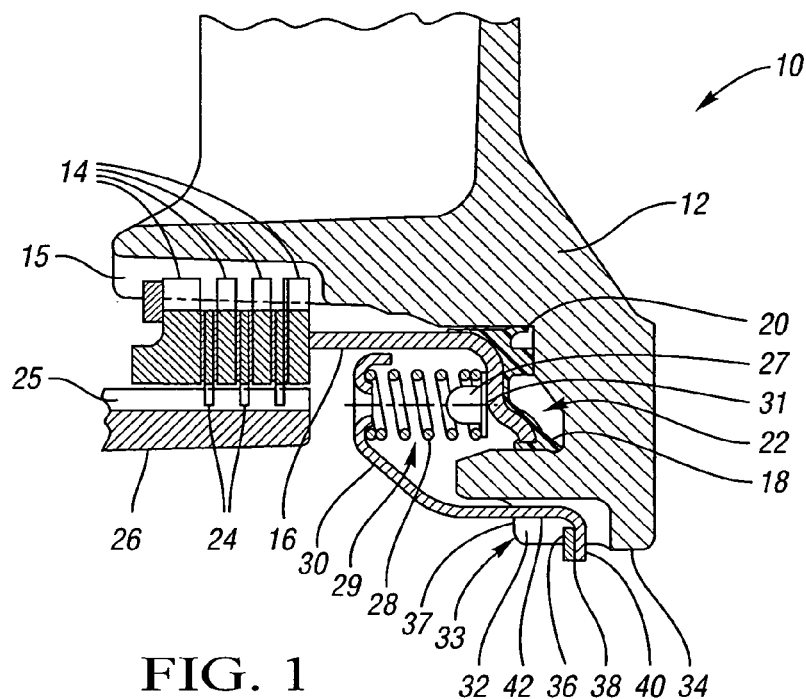
FIG. 1 is a sectioned elevational view of a portion of a selectively engageable transmission torque-transmitting assembly, or clutch, having a castellated snap ring retention system consistent with the present invention.

In FIG. 1 there is seen a portion of a transmission torque-transmitting mechanism or clutch 10. This torque-transmitting mechanism 10 includes a first housing 12, which is splined at 15 to receive a plurality of reaction plates 14. Slidably disposed within the first housing 12 is a piston 16, which has an inner seal portion 18 and an outer seal portion 20 such that a variable volume chamber 22, formed between the piston 16 and the first housing 12, is capable of holding fluid. Interdigitated with the reaction plates 14 is a plurality of friction plates 24, which are splined at 25 onto a second housing 26. Upon pressurization of the fluid disposed within the variable volume chamber 22, the piston 16 will urge the reaction plates 14 and friction plates 24 into frictional engagement with each other thereby locking the first housing 12 with the second housing 26. Upon depressurization of the fluid disposed within the variable volume chamber 22, the piston 16 is urged or biased out of engagement with the reaction plates 14 by an array or plurality of springs 28 disposed respectively on nubs 27 of an annular ring 31 within the spring cavity 29 formed between the piston 16 and a retainer plate 30.

The first housing 12 has formed therein a circumferentially disposed castellation 33 forming a plurality of notches 32 circumferentially disposed and radially directed about a bore 34 defined by the first housing 12 through which a shaft (not shown) may pass. An inwardly facing circumferential groove 36 is provided within the radially directed protruding blocks or dentils 37 formed by the castellation 33. A retaining ring 38 is disposed within or snapped into the circumferential groove 36. The retaining ring 38 abuts a plurality of flanges 40 projecting approximately perpendicular to each of the plurality of fingers 42 of the retainer plate 30. The retaining ring 38 forms a reactive member or stop for the axial forces of the coil springs 28.

Figure 2:
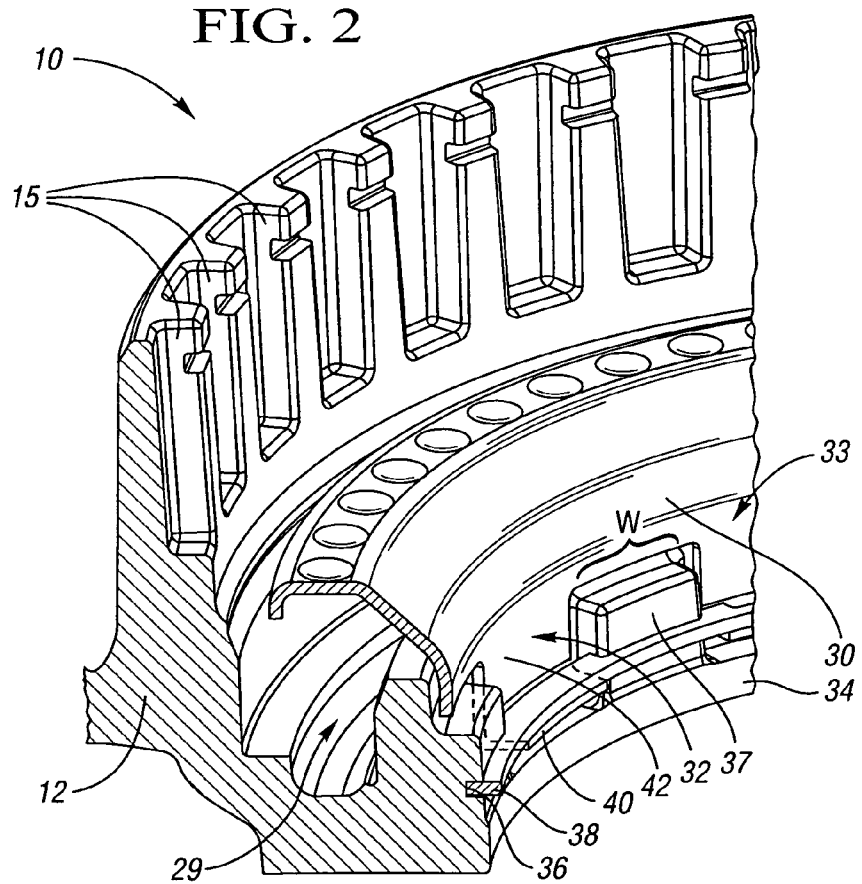
FIG. 2 is a sectional perspective view of a portion of a partially assembled clutch illustrating the castellated snap ring design of the present invention.

FIG. 2 is a sectional perspective view of a portion of a partially assembled clutch 10 illustrating the castellated snap ring design of the present invention. The dentils 37 in the preferred embodiment number six, and have a width W that measures approximately equal to the arc length formed by a 40 degree included angle. A complimentary number of fingers 42 formed from the retainer plate 30 are appropriately respectively sized to interfit with the notches 32.

The retaining ring 38 in the preferred embodiment is an internal snap ring. The specification of the retaining ring 38 must comprehend the tension force necessary to keep the retaining ring 38 disposed within the circumferential groove 36. In addition, the retaining ring 38 must be of sufficient width to provide an adequate bearing surface upon which the flanges 40 of the fingers 42 engage and stop.

Referring again to FIG. 1, the present invention also provides a method of releasably retaining at least one coil spring 28 with respect to a first housing 12. A castellation 33 within the first housing 12 forms a plurality of radially, inwardly facing dentils 37 each of which has a radially inwardly facing circumferential groove 36. A retainer plate 30 with a plurality of fingers 42 is then placed against the coil springs 28. The retainer plate 30 must then be oriented with respect to the first housing 12 such that each one of the plurality of fingers 42 aligns with a respective one of the plurality of notches 32. Subsequently, the coil springs 28 will be compressed with respect to the first housing 12 such that each of the fingers 42 engages each of the notches 32. A retaining ring 38 will then be placed within the radially inwardly facing circumferential groove 36 to retain the coil spring 28 in compression with respect to the first housing 12.

While the best modes for carrying out the invention have been described in detail, those familiar with the art to which this invention relates will recognize various alternative designs and embodiments for practicing the invention within the scope of the appended claims.

The invention claimed is:

1. A retaining apparatus comprising:
    a housing having a circumferential castellation, said castellation forming a plurality of notches and a plurality dentils each of said dentils being radially extending and circumferentially oriented, each of said dentils having an radially inwardly facing circumferential groove;
    a retainer plate having a plurality of approximately axially extending fingers each disposed respectively within said notches formed by said castellation, each of said plurality of fingers each having a flange disposed approximately perpendicular to its respective finger;
    a resilient element disposed between said retainer plate and said housing for applying an axial force to said retainer plate; and
    a retaining ring retainable within said circumferential groove of said plurality of dentils, and operable to limit the axial movement of said retainer plate with respect to said housing by engaging at least one of said flanges disposed on said plurality of fingers.

2. The retaining apparatus of claim 1, wherein said resilient element is at least one coil spring member.

3. The retaining apparatus of claim 1, wherein said plurality of dentils number six, and each of said plurality of dentils is evenly spaced from an adjacent other of said dentils with a width approximately equal to the arc length formed by a 40 degree included angle.

4. The retaining apparatus of claim 3, wherein said plurality of fingers number six and are sized such that they can interfit with a respective one of said plurality of notches.

5. The retaining apparatus of claim 1, wherein said retainer plate is formed from stamped metal.

6. The retaining apparatus of claim 1, wherein said retaining ring is an internal snap ring.

7. A method of releasably retaining at least one coil spring with respect to a housing comprising:
    providing said housing with a circumferential castellation forming a plurality of notches and a plurality of radially inwardly facing dentils, each of said dentils having a radially inwardly facing circumferential groove;
    placing a retainer plate with a plurality of fingers against said coil spring;
    orienting said retainer plate with respect to said housing so that said plurality fingers align respectively with said plurality of notches formed from said housing by said circumferential castellation;
    compressing said at least one coil spring with said retainer plate in relation to said housing when said retainer plate is oriented so that each of said plurality of fingers respectively interfit with one of said plurality of notches; and
    placing a retaining ring within said radially inwardly facing circumferential groove after said compressing to retain said at least one coil spring in compression with respect to said housing.

8. The method of releasably retaining a coil spring with respect to the housing of claim 7, wherein said retaining ring is an internal snap ring.

9. A castellated snap ring arrangement for releasably retaining at least one coil spring comprising:
- an annular housing having a circumferential, radially directed castellation at least partially defining a spring cavity on a radially outer side of said castellation;
- a retainer plate in a cooperative relationship with said castellation for retaining at least one spring within said spring cavity;
- an internal snap ring for retaining said retainer plate in said cooperative relationship with said castellation; and
- a circumferential groove on a radially inner side of said castellation for receiving said internal snap ring.

* * * * *